E. J. HUGHES.
FLANGE JOINT MEMBER AND PROCESS OF PRODUCING SAME.
APPLICATION FILED JUNE 8, 1917.
1,291,646.
Patented Jan. 14, 1919.
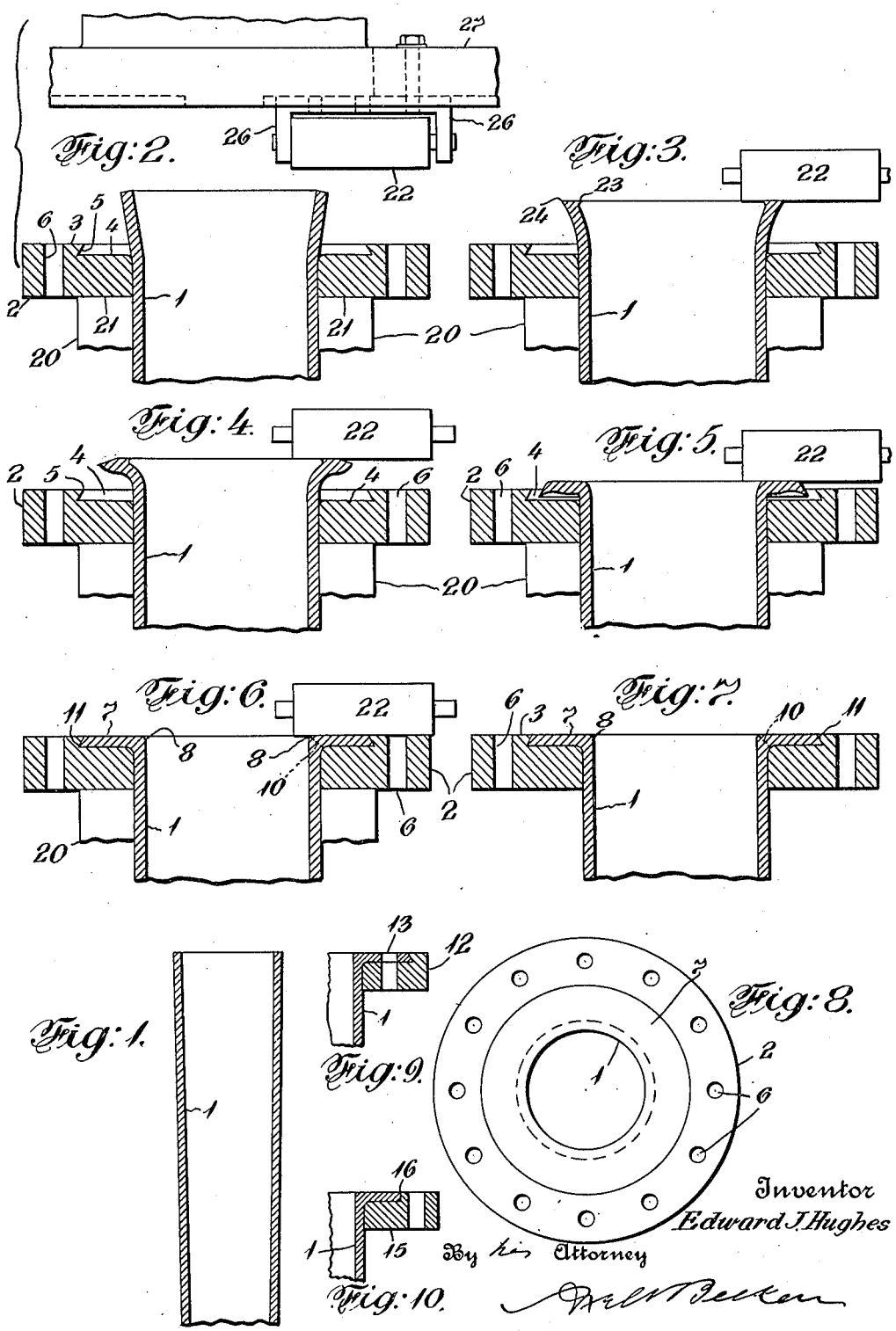
Inventor
Edward J. Hughes
By his Attorney

UNITED STATES PATENT OFFICE.

EDWARD J. HUGHES, OF BLOOMFIELD, NEW JERSEY.

FLANGE-JOINT MEMBER AND PROCESS OF PRODUCING SAME.

1,291,646.　　　　　Specification of Letters Patent.　　Patented Jan. 14, 1919.

Application filed June 8, 1917. Serial No. 173,494.

*To all whom it may concern:*

Be it known that I, EDWARD J. HUGHES, a citizen of the United States, and a resident of Bloomfield, county of Essex, and State of New Jersey, have invented a certain new and useful Improvement in Flange-Joint Members and Processes of Producing Same, of which the following is a specification.

The present invention relates generally to flange joint members of a type analogous to the well-known Van Stone joint. The so-called Van Stone flange joint consists of a ductile iron pipe, having at its end a relatively narrow-width integral radial flange or lap, and provided with a reinforcing collar of relatively large diameter for the reception of bolts to fasten adjacent pipe sections together. Since the circumference of the lap is greater than that of the pipe, it is now the practice to compensate for this increase by gradually thinning out the metal of the body of the lap into taper formation so that the two faces thereof are not parallel. The metal, however, can not be upset in this manner to any but a very limited extent because it renders the lap weak and because of the production of radial fissures.

In the commercial production of joints of this character, as it exists in the prior art, the reinforcing collars are loose on the pipe. Sometimes, however, the reinforcing collar is provided with an annular groove in its face into which the end of the pipe is upset, but in such cases it is necessary to machine the lap and the face of the collar in order to give them a smooth finish so that when two of these pipe joint members are placed together they will form a tight joint. Such machining of the metal necessarily reduces the thickness of the taper body of the lap and in some instances also reduces the amount of metal at the bend of the pipe and lap thereby weakening it to a considerable extent.

The main object of this invention is to devise a process of flanging the ends of pipes whereby the flange will have at least substantially the same thickness as the wall of the pipe, throughout its extent, so that the flange will have the same power of resistance to stresses as the pipe itself.

In the prior art it has always been attempted heretofore to control and guide or confine the flow of the metal in some way during the rolling operation. This has been done in many ways, too numerous to mention here, but a typical method has been to initially act upon the end of the pipe by means of conical rollers, thereby attempting to turn, so to speak, the flange from a definite point, and thereafter to use flattening rollers to bring the flange into a plane substantially at right angles to the axis of the pipe. In other cases, it has been the custom to otherwise initially direct the flow of the metal, and to prevent it from taking what might be called its natural path. I have found that, if the metal is given an unobstructed radial flow, due to rolling the end of the pipe under pressure exerted in a direction substantially parallel to the axis of the pipe, the flange so produced will not be gradually thinned out, but can be made of a substantially uniform thickness throughout its extent at least equal to substantially the thickness of the wall of the pipe; and, further, that in this way the bend of the pipe and flange may actually be strengthened, because of an inward displacement of the metal which takes place, to form what may be called a square corner at said bend. This method enables me to roll a much stronger flange which may be used in the ordinary way in connection with reinforcing collars for the bolts, and which also permits the flange to be rolled into an undercut groove in such reinforcing collars to firmly unite the flange and reinforcing collar.

Another object of this invention is the production of a flange joint member in which the lap of the pipe will have the same thickness and strength as the wall of the pipe itself and in which the amount of metal at the bend of the pipe and lap is preferably appreciably greater than the thickness of the wall of the pipe.

Another object of the invention is to produce a flange joint member in which the reinforcing collar and the lap of the pipe are firmly secured together.

One feature of the invention resides in a flange joint member and in the process of making same consisting of a ductile iron pipe, a collar surrounding said pipe having a face extending radially of the axis of the pipe, said face having an annular groove of a uniform depth substantially equal to the thickness of the wall of the pipe, and the said pipe having an outwardly rolled single layer lap of uniform thickness throughout substantially equal to the thickness of the wall of the pipe extending into and filling said groove and substantially flush with the face of the collar.

Preferably the annular groove in the face of the collar is provided with a tapered undercut portion and the lap of the pipe is provided with a correspondingly tapered portion at its periphery that firmly unites the collar and lap. Preferably also the metal at the bend of the pipe and the lap is thicker than the wall of the pipe so as to give additional strength at the point where it is most needed.

Other features of invention will appear as the specification proceeds.

In the accompanying drawings the invention is disclosed in several concrete and preferred forms and in these drawings:

Figure 1 is a diagrammatic view showing the end of the pipe heated to produce an appreciable deformation thereof.

Fig. 2 is a diagrammatic view showing the pipe clamped near its end so as to localize and accentuate the deformation and showing the pipe rolling means in the position which it occupies before it engages the pipe.

Figs. 3, 4, 5 and 6 are diagrammatic views showing the various stages of operation during the rolling of the lap of the pipe.

Fig. 7 is a sectional view of the finished product showing one form of the invention.

Fig. 8 is a face view of the parts shown in Fig. 7.

Fig. 9 shows a modification: and

Fig. 10 shows still another modification.

Referring to Figs. 7 and 8, 1 indicates the ductile iron pipe by which is meant a pipe of a material such as Bessemer or open hearth steel, wrought iron or other "workable" iron products in contradistinction to cast iron. 2 is the collar of any suitable material having a face 3 provided with an annular groove 4 of a depth substantially equal to the thickness of the wall of the pipe. This groove has a tapered undercut portion at 5 and is also provided with bolt holes 6 so as to permit two members to be bolted together. The pipe 1 is provided with a single layer lap 7 of uniform thickness throughout equal to the thickness of the wall of the pipe and having a square corner 8 at the bend of the pipe and lap so that the thickness of the metal measured by the line 10 is appreciably greater than the thickness of the wall of the pipe. In this construction of pipe, the collar and the pipe united by the tapered peripheral portion of the lap, and the face of the lap is rol flush with the face of the collar so that desired no subsequent machining need done, or if machining is done, the stren; of the joint as a whole will not be materia affected. A joint of this character is herently stronger than a joint in which body of the lap is of taper formation, a can moreover be made of much grea greater width than the ordinary constr tion of tapered lap joint. It further l the advantage that the collar is secured p manently in position to the lap and the fore to the pipe.

In Fig. 9 is shown another form of the i vention in which the collar 12 is of mu smaller diameter than the correspondi collar shown in Figs. 7 and 8 because he the bolt holes 13 are passed through bo the lap and the collar, such construction l ing made possible by the fact that the l and the collar are firmly united and becau of the considerable width of lap employe and further, by the fact that the lap lies an annular groove of the collar and has i face flush with that of the collar.

In Fig. 10 substantially the same co struction as is shown in Fig. 7 is employe except that the collar 15 is not provide with an undercut taper portion but has straight vertical outer wall 16. In this for of the invention the collar and the lap a not secured together permanently but, ne ertheless, owing to the width of the lap, very strong joint is produced.

In practice, the end of the pipe is heate until it has an appreciable deformation a indicated diagrammatically in Fig. 1. It i then projected through the collar 2 and th parts clamped in the clamp 20, as indicate in Fig. 2, with the collar abutting agains the side faces 21 of the clamp. By thi means, the deformation is localized at th end of the pipe. The heated end of the pip and the roller 22 are now caused to ap proach toward each other preferably by moving the roller 22 toward the end of th pipe under pressure until it comes into en gagement therewith. The initial effect o the engagement of the roller 22 with the enc of the pipe is to produce both inwardly anc outwardly extending portions 23 and 24 or the end of the pipe. During the continued rolling action, as shown in Fig. 4, both of said portions are then rolled outwardly into flange formation to form a flange that is thicker than the wall of the pipe. The rolling operation continues, as in Fig. 5, until the lap enters the annular groove in the collar, after which the lap is rolled still further, as shown in Fig. 6, to increase the width of the flange and to reduce it to a thickness substantially equal to that of the pipe and uniform throughout and to roll it into intimate engagement with the undercut taper portion of the collar. It will be understood that during this finishing process the collar forms in effect an abutment member and the roller 22 rolls the face of the lap flush with the face of the abutment member or collar so that machining may, if desired, be dispensed with. During this finishing operation the metal has been displaced both outwardly under the tapered undercut portion as described and inwardly to form the square corner 8 previously described. The steps of operation used in producing the forms of the invention shown in Figs. 9 and 10 are substantially those that have already been described in connection with the form shown in Figs. 7 and 8, except that in Fig. 9 the bolt holes must be formed in the lap and collar after they have been secured together.

It will be noted that in the rolling process described, the metal is permitted to take what might be called its natural path, that is to say, no attempt is made to guide, confine or control the metal except by the roller 22. The result is that the metal has an unobstructed radial flow or is displaced outwardly into flange formation which is, during the continued rolling operation, displaced still further outwardly while the lap of the pipe is brought into what may be called successive substantially parallel planes.

The roller 22 is rotatable in its bearings 26 and these bearings are mounted in a rotating member 27 whose center of rotation is coincident with that of the pipe. The bearings 26 on which the roller is mounted hold it in such position that its rotating contact is substantially at right angles to the axis of the pipe.

I claim:

1. A flange joint member comprising: a ductile iron pipe, a collar, surrounding said pipe, having a face radial to the axis of the pipe, said collar having an annular groove in its face of a uniform depth substantially equal to the thickness of the wall of the pipe, said pipe having an outwardly rolled single layer lap, of a uniform thickness throughout substantially equal to the thickness of the wall of the pipe, extending into and filling said groove and substantially flush with the face of the collar.

2. A flange joint member comprising: a ductile iron pipe, a collar, surrounding said pipe, having a face radial to the axis of the pipe, said collar having an annular groove in its face, provided with a tapered undercut portion, of a uniform depth substantially equal to the thickness of the wall of the pipe, said pipe extending through said collar and being permanently secured thereto by an outwardly rolled single layer lap, of a uniform thickness throughout substantially equal to the thickness of the wall of the pipe, extending into and filling said groove including the tapered undercut portion and substantially flush with the face of the collar.

3. A flange joint member comprising: a ductile iron pipe, a collar, surrounding said pipe, having a face radial to the axis of the pipe, said collar having an annular groove in its face, provided with a tapered undercut portion, of a uniform depth substantially equal to the thickness of the wall of the pipe, said pipe extending through said collar and being permanently secured thereto by an outwardly rolled single layer lap, of a uniform thickness throughout substantially equal to the thickness of the wall of the pipe, extending into and filling said groove including the tapered undercut portion and substantially flush with the face of the collar, and the thickness of the metal at the bend of the pipe and lap being appreciably greater than that of the wall of the pipe.

4. A flange joint member comprising: a ductile iron pipe, a collar, surrounding said pipe, having a face radial to the axis of the pipe, said collar having an annular groove in its face of a uniform depth substantially equal to the thickness of the wall of the pipe, said pipe having an outwardly rolled single layer lap, of a uniform thickness throughout substantially equal to the thickness of the wall of the pipe, extending into and filling said groove and substantially flush with the face of the collar, and the thickness of the metal at the bend of the pipe and lap being appreciably greater than that of the wall of the pipe.

5. The process of producing a flange joint member on a ductile iron pipe which consists in applying a reinforcing collar provided with a face having an annular groove at right angles to the axis of the pipe, in heating the end of the pipe sufficiently to produce an appreciable outward deformation thereof, and in then outwardly upsetting the heated end into said annular groove by rolling it under pressure applied in a direction substantially parallel to the axis of the pipe and substantially at right angles to the face of the collar.

6. The process of producing a flange joint member on a ductile iron pipe which consists in applying a reinforcing collar provided with a face having an annular groove at right angles to the axis of the pipe, in heating the end of the pipe sufficiently to produce an appreciable outward deformation thereof, and in clamping the pipe near the end, to localize said deformation and in then outwardly upsetting the heated end of the pipe into said annular groove by rolling it under pressure applied in a direction substantially parallel to the axis of the pipe and substantially at right angles to the face of the collar.

7. The process of producing a flange joint member on a ductile iron pipe which consists in applying a reinforcing collar provided with a face having a tapered undercut annular groove at right angles to the axis of the pipe, in heating the end of the pipe sufficiently to produce an appreciable outward deformation thereof, and then in permanently securing the reinforcing collar to said pipe by outwardly upsetting the heated end into said tapered undercut annular groove to fill the groove flush with the face of said collar by rolling the heated end of said pipe under pressure applied in a direction substantially parallel to the axis of the pipe and substantially at right angles to the face of the collar.

8. The process of producing a flange joint member on a ductile iron pipe which consists in applying a reinforcing collar provided with a face having a tapered undercut annular groove at right angles to the axis of the pipe, in heating the end of the pipe sufficiently to produce an appreciable outward deformation thereof, and in clamping the pipe near the end, to localize said deformation and then in permanently securing the reinforcing collar to said pipe by outwardly upsetting the heated end into said tapered undercut annular groove to fill the groove flush with the face of the collar by rolling the heated end of said pipe under pressure applied in a direction substantially parallel to the axis of the pipe and substantially at right angles to the face of the collar.

9. The process of producing a flange joint member on a ductile iron pipe which consists in providing a circumferential reinforcing collar having a finished outer face and having an annular groove, in heating the end of the pipe to thereby produce an outward deformation thereof and projecting the heated end of the pipe through the collar, and then in upsetting the heated end of the pipe flush with the face of the collar into the annular groove thereof by rolling the heated end of the pipe under pressure applied in a direction substantially parallel with the axis of the pipe and substantially at right angles to the face of the pipe.

10. The process of producing a flange joint member on a ductile iron pipe which consists in providing a circumferential reinforcing collar having a finished outer face and having an annular groove, in heating the end of the pipe to thereby produce an outward deformation thereof, projecting the heated end of the pipe through the collar, and clamping the pipe thereby localizing the outward deformation of the heated end and then in upsetting the heated end of the pipe flush with the face of the collar into the annular groove thereof by rolling the heated end of the p under pressure applied in a direction s stantially parallel to the axis of the pipe a substantially at right angles to the face the collar.

11. The process of producing a flange jo member on a ductile iron pipe which consi in providing a circumferential reinforci collar having a finished face and having tapered undercut annular groove, in heati the end of the pipe sufficiently to produce appreciable outward deformation there then in permanently securing the collar said pipe by rolling the heated end und pressure applied in a direction substantial parallel to the axis of the pipe to outward upset the heated end into the tapered unde cut annular groove, and in thereafter rollir both the face of the collar and the upset po tion under pressure similarly applied to fi ish the upset portion flush with the face c the collar.

12. The process of producing a flange joir member on a ductile iron pipe which consist in providing a circumferential reinforcin collar having a finished face and having tapered undercut annular groove, in heatin, the end of the pipe sufficiently to produce a appreciable outward deformation thereof and in clamping the pipe near the end to lo calize said deformation and then in perma nently securing said collar to the pipe b rolling the heated end under pressure ap plied in a direction substantially parallel t the axis of the pipe to outwardly upset th heated end into the tapered undercut annu lar groove, and thereafter in rolling both the face of the collar and the upset portion un der pressure similarly applied to finish the upset portion flush with the face of the collar.

13. The process of producing a flange joint member on a ductile iron pipe which consists in providing a circumferential reinforcing collar having a finished face and having an annular groove, in heating the end of the pipe sufficiently to produce an appreciable outward deformation thereof, and then in upsetting the heated end of the pipe flush with the face of the collar into the annular groove thereof by rolling the heated end of the pipe under pressure exerted in a direction substantially parallel to the axis of the pipe, and then in rolling both the face of the collar and the upset portion under pressure in the same direction to finish the latter flush with the face of the collar.

14. The process of producing a flange joint member on a ductile iron pipe which consists in providing a circumferential reinforcing collar having a finished face and having an annular groove, in heating the end of the pipe sufficiently to produce an appreciable outward deformation thereof, and clamping the pipe near the end to localize said deformation and then in upsetting the heated end of the pipe flush with the face of the collar into the annular groove thereof by rolling the heated end of the pipe under pressure exerted in a direction substantially parallel to the axis of the pipe, and then in rolling both the face of the collar and the upset portion under pressure in the same direction to finish the latter flush with the face of the collar.

Signed at New York, in the county of New York, and State of New York, this 6th day of June, 1917.

EDWARD J. HUGHES.